Dec. 25, 1951 N. W. EUREY 2,579,730
WARP BEAM AND HARNESS FRAME TRANSPORTING TRUCK
Filed Feb. 19, 1949 3 Sheets-Sheet 1
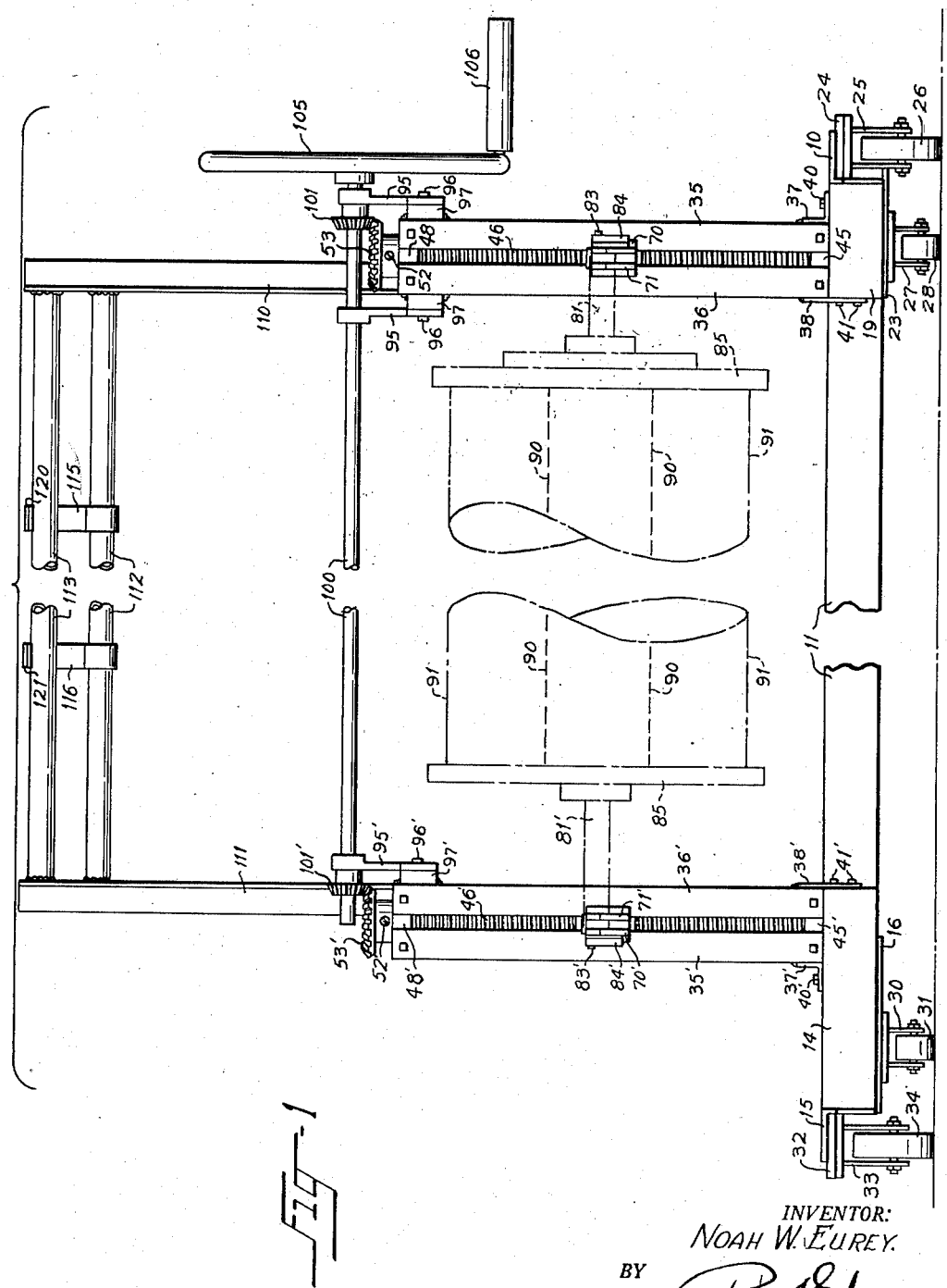
INVENTOR:
NOAH W. EUREY
BY
ATTORNEY.

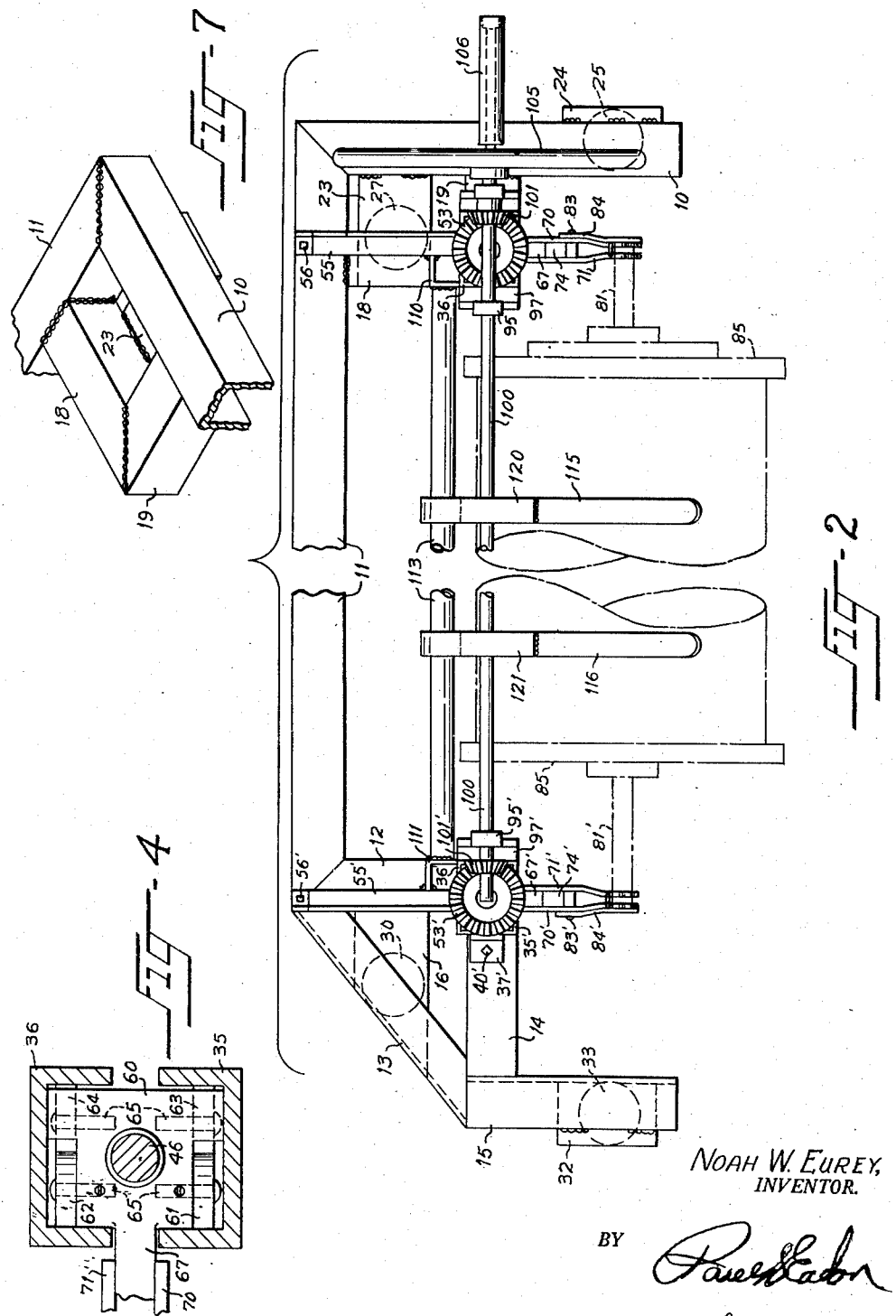

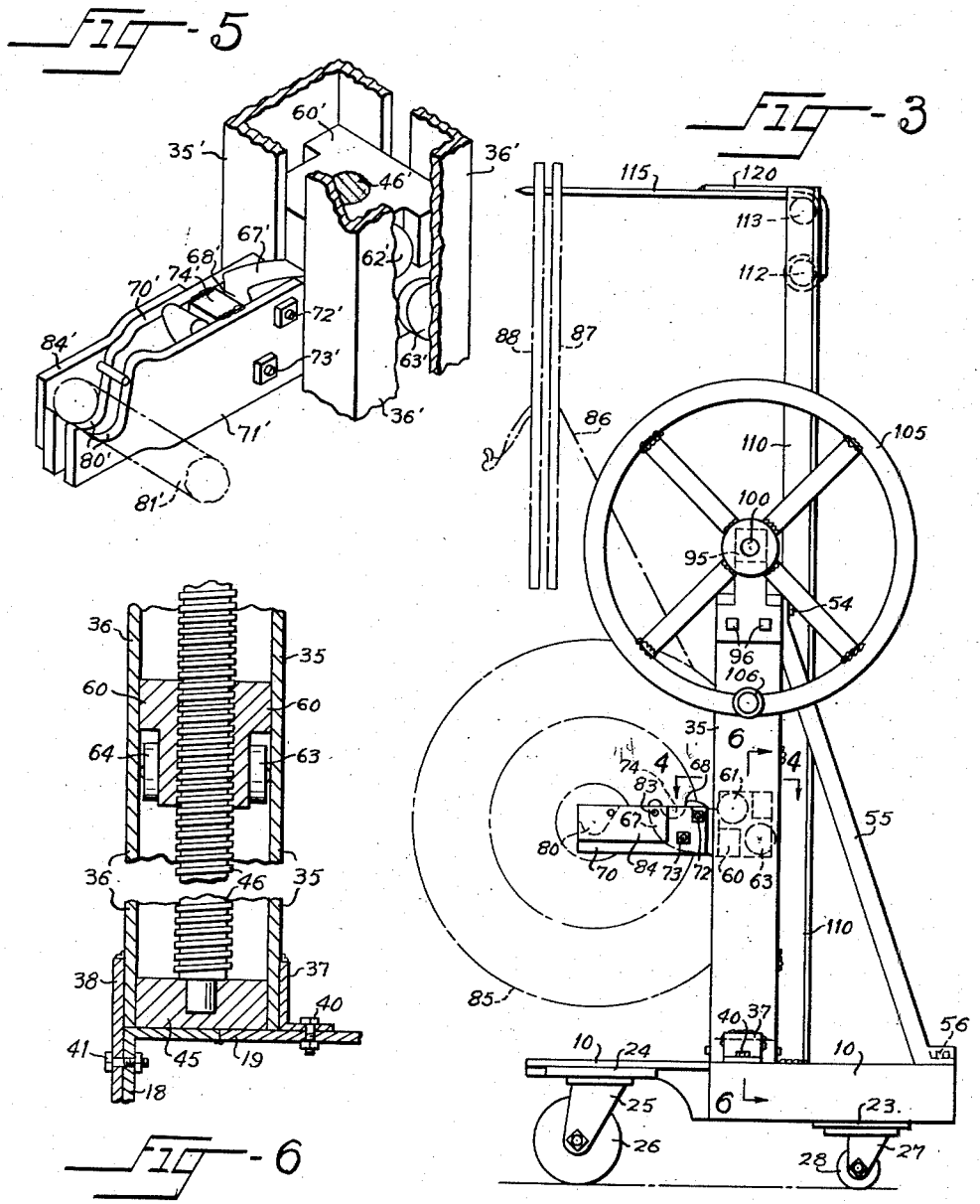

Patented Dec. 25, 1951

2,579,730

UNITED STATES PATENT OFFICE 2,579,730

WARP BEAM AND HARNESS FRAME TRANSPORTING TRUCK

Noah W. Eurey, Lincolnton, N. C.

Application February 19, 1949, Serial No. 77,327

3 Claims. (Cl. 28—41)

This invention relates to a truck and more especially to a truck for use in weaving mills for the transportation of exhausted warp beams and harnesses from a loom to a tying-in machine and for transporting a replenishing full warp beam and harnesses associated therewith back to the loom from whence the exhausted warp beam has been removed for installation therein.

It is quite a laborious proposition to remove an empty warp beam from a loom and to transport it to the tying-in room and there tie in the hundreds and sometimes thousands of warp ends extending from an exhausted warp beam to a full warp beam and transporting the full warp beam back to the loom. This has heretofore been done by warp beam trucks having a cradle for supporting the warp beam and moving it longitudinally down the aisle, such as shown in the patent to Lewis, Number 2,189,010, dated February 6, 1940; however, the Lewis truck is useful in transporting warp beams to looms whose ends have not been entered in the harnesses, but the present invention is especially adapted for transporting warp beams after the ends thereon have been entered in a plurality of harness frames.

It is, therefore, an object of this invention to provide a truck with means for engaging the ends of the warp beam spindles of an exhausted warp beam and also for supporting the harnesses associated with the warp extending therefrom and for transporting the same to another part of a mill where a suitable warp beam supported by a truck similar to the truck shown can have its ends tied into the ends extending from the exhausted warp beam and the harnesses associated therewith can be lifted from the truck which brought them from the loom and deposited onto similar means on the truck having the filled warp beam thereon so that the new warp beam and the harnesses associated therewith can be transported back to the weaving room and installed in the loom.

Some of the objects of the invention having been stated, other objects will appear as the description proceeds, when taken in connection with the accompanying drawings, in which Figure 1 is a front elevation of the apparatus;

Figure 2 is a top plan view looking down on Figure 1;

Figure 3 is an end elevation looking from right to left in Figure 1;

Figure 4 is a sectional plan view taken along the line 4—4 in Figure 3;

Figure 5 is an isometric view with parts broken away and showing one of the means for supporting the ends of a warp beam;

Figure 6 is a vertical sectional view taken along the line 6—6 in Figure 3;

Figure 7 is a detail view of the upper right-hand corner of the base frame shown in Figure 2.

Referring more specifically to the drawings, the numeral 10 indicates an inverted channel member having joined to one end thereof an inverted channel member 11, to the other end of which is secured an inverted channel member 12, and channel members 13 and 14 are secured at one end to one of the sides and near the end of the channel member 12 and having their other ends secured to each other and secured to the other ends of the channel members 13 and 14 is another inverted channel member 15. Secured to the lower surfaces of channel members 12 and 13 is a plate 16 and the channel bar 11 has secured thereto a channel bar 18 which projects forwardly, or downwardly in Figure 2, and has a cross channel bar 19 secured thereto, whose other end is secured to the channel bar 10. A plate 23 is secured to the lower edges of the channel bars 10 and 18.

The outer walls of the channel bars 10 and 15 are cut away and a plate 24 is welded to the lower surface of angle bar 10 which has rotatably mounted therein a conventional caster bracket 25 having a caster wheel 26 therein. The plate 23 is a part of a conventional caster wheel mechanism having rotatably mounted therein a forked member 27 which has a wheel 28 rotatably mounted therein. The plate 16 has rotatably mounted therein a wheel support 30 which has a wheel 31 rotatably mounted therein. To the lower surface of the top portion of channel member 15 where its outer side is cut away is welded a plate 32 which is a part of a rotatable caster mechanism 33 which has a wheel 34 rotatably mounted therein.

The channel member 19 has welded thereto the lower ends of channel members 35 and 36 which are also secured to the channel member 19 by brackets 37 and 38 being secured to the channel member 19 by any suitable means such as bolts 40 and 41, respectively, and these brackets 37 and 38 are welded to the uprising bars 35 and 36.

Mounted in the space between the lower ends of the channel members 35 and 36 and resting on the top of plate 19 is a bearing block 45 in which the lower end of a worm screw 46 is mounted for rotation. The upper ends of the channel bars 35 and 36 have a block 48 secured therebetween which is rotatably penetrated by the upper end of the worm screw 46 which may be restricted at its upper end where it passes through the block 48 and has fixedly secured thereon, as by means of a set screw 52, a beveled gear 53. The block 48 has secured thereto, by an suitable means such as a screw 54, a brace bar 55 which extends downwardly and rearwardly or to the right in Figure 3 and is secured to the channel bar 11 by any suitable means such as a screw 56. Threadably mounted on the screw 46 and slidably confined within the angle bars 35 and 36 is a block 60 having a plurality of recesses cut therein in which rollers 61 and 62 are mounted and lower recesses in which rollers 63 and 64 are mounted by having suitable pins 65 fixed in the block 60 and on which the rollers 61 to 64 inclusive are rotatably mounted. This block has a neck portion 67 extending therefrom having a cavity 68 in its upper surface.

A pair of strap iron members 70 and 71 are secured on opposite sides of the neck portion 67 by means of a suitable bolt 72 and another bolt 73 also penetrates the neck portion 67 and thus fixedly secures the strap iron members 70 and 71 on the neck portion 67. Bridging the distance between the strap iron members 70 and 71 is a cross piece 74 which is welded to the proximate surfaces of the strap iron members 70 and 71 and is adapted to rest in the cavity 68 of the neck portion 67. The outer ends of the strap iron members 70 and 71 have coinciding notches or cavities 80 therein in which the end portion of a warp beam spindle 81 is adapted to rest. The warp beam spindles 81 form a part of a warp beam 85 which has a plurality of warp threads 86 extending therefrom. These warp threads are threaded through suitable harness frames 87 and 88 in a loom. In the drawings, the dotted lines 90 indicate the diameter of a warp beam with a few rounds of warp threads thereon when it is about exhausted and it is brought from the loom, while the dotted lines 91 indicate a full warp beam which would be transported back to the loom in a truck similar to the one shown.

To prevent endwise movement of the warp beam shaft spindles 81 and the warp beam of which they are a part, there is pivotally secured as at 83 strap iron members 84 which are on the remote sides of the strap iron members 70 and 70' respectively, and each is adapted to be pivoted to the position shown in Figures 1, 2, 3 and 5 to prevent endwise movement of the warp beam.

The description of the uprising angle bars 35 and 36, the worm screws 46, the blocks 48 in the top thereof, the bevel gears 53 and other parts, which have been described for the right-hand side of Figure 1, will likewise apply to the structure in the left-hand side of Figure 1, with the prime notation added, the only difference being that the block 45 instead of resting on the plate 19 will be resting on plate 14.

Rising upwardly from the angle bars 35, 36 and 35' are bearing members 95 which are secured by any suitable means such as by set screws 96, to blocks 97 secured to the uprising members 35, 36 and 35'. In these bearing members 95 is rotatably mounted a shaft 100 which has beveled gears 101 and 101' fixed thereon and adapted to mesh with the bevel gears 53 and 53' fixed on the upper ends of worm shafts 46 and 46'. This shaft 100 has a hand wheel 105 secured thereon for imparting rotation to the shaft 100 and this hand wheel may have a crank member 106 projecting therefrom, if desired, for easier and more rapid turning of the shaft 100.

Resting on the channel members 12 and 18 and welded thereto and also welded to the vertical channel members 36 and 35' are angle bars 110 and 111 and these angle bars 110 and 111 project upwardly a substantial distance above the upper ends of the channel bars 35, 36, 35' and 36' and have spanning the distance therebetween a pair of brace pipes 112 and 113 and these pipes 112 and 113 are welded to the proximate surfaces of the upright angle bars 110 and 111.

Pivotally and slidably mounted on the bar or pipe 112 are a plurality of bars 115 and 116 which extend upwardly and are bent at right angles over the pipe 113 and extend forwardly in Figure 1 or to the left in Figure 3, and since these are flattened members, they are adapted to be inserted beneath the top frame bar of the harness frames 87 and 88 as there is a small space between the heddles in a harness frame and the lower surface of the top frame bar of the heddle frame and thus, in this manner, the heddle frames 87 and 88 are supported with warp threads 86 passing therethrough. The bars 115 and 116 are slidably mounted on the pipe 112 to permit adjustment of the same for the reception of harness frames of various sizes. Also, the bars 115 and 116 are pivotally mounted on the bar 112 so they may be swung in a clockwise direction in Figure 3 when not in use so as to depend from the bar 112 and to be out of the way of other objects as the truck is moved from one place to another.

To tie the warp threads from a new warp roll, a similar truck to the one shown would be rolled alongside or to the left-hand side of the truck shown in Figure 3 and the warp ends on the left-hand side of the heddle frames in Figure 3 would be tied into the new warp threads from the new warp beam and then the warp threads 86 would be suitably secured to the cloth take-up mechanism in the loom when weaving can be resumed.

It is to be noted that the supporting members 115 and 116 are reinforced at their right-angular bent portions by suitable additional strap members 120 and 121 being welded to their outer and upper surfaces to reinforce the same against bending.

Attention is called to the fact that the distance between the uprights 35' and 36' and the caster wheel 34 is greater than the distance between the uprights 35 and 36 and the caster wheel 26. This additional distance is required in order to avoid contact with parts of the loom when the truck is rolled to a position to remove an empty warp beam or to install a new warp beam.

It is thus seen that there has been provided a suitable warp beam truck which can be rolled to the warp end of a loom and rolled into where the hook members 70 and 71 and 70' and 71' have their cavities 80 and 80' immediately below the ends of the spindles 81 of the warp beam and this exhausted warp beam, along with the harnesses 87 and 88 along with the warp extending from the about to be exhausted warp beam through the heddle frame can be transported to another portion of a mill where a new warp beam can be tied thereinto and returned and with its harnesses and installed in the loom.

In the drawings and specification there has been set forth a preferred embodiment of the invention, and although specific terms are employed, they are used in a generic and descriptive sense only and not for purposes of limitation, the scope of the invention being defined in the claims.

I claim:

1. A truck for transporting warp beams and harnesses to and from a loom comprising a substantially flattened U-shaped frame having a leg at each side thereof and being horizontally disposed, the two legs of the frame having a space therebetween which is greater than the space occupied by a loom, a plurality of wheels mounted on the lower portion of the frame for supporting it on a floor, there being a wheel on the lower surface near the ends of the legs of the U-shaped frame to permit the legs to pass on the outside of the loom frame, a pair of tubular posts rising vertically from the frame in spaced relation to each other and each having a threaded rod mounted therein, a horizontally disposed shaft disposed above the upper ends of the threaded rods and having a pair of bevel gears thereon, the upper ends of the threaded rods having beveled gears meshing with the beveled gears on the rotatable shaft, a vertically movable member disposed within each of the tubular posts and being threadedly penetrated by the threaded rods, the vertically movable members having outwardly projecting portions having cavities in their upper surfaces adapted to engage the spindles of a warp beam for elevating the same out of its conventional holding means on a loom, a pair of spaced upright bars disposed adjacent the vertically disposed tubular posts and extending to a substantially higher elevation than the tubular posts and having a pair of spaced members disposed between the proximate surfaces of said upright bars and a pair of members pivoted on the lower of said spaced members and projecting upwardly and laterally above the upper one spaced members and to a point disposed above the warp beam carried by the vertically movable members and onto which harnesses are adapted to be placed for carrying the same along with the warp beam.

2. A warp beam and harness truck comprising a horizontal framework having a pair of spaced horizontal legs extending from one side and near the ends thereof and each of the legs having wheels mounted on their lower sides and the frame also having one or more wheels mounted on its lower side, a pair of spaced tubular members rising upwardly from the frame and having vertically slidable members disposed therein, threaded shafts disposed in the tubular members and threadedly penetrating the vertically slidable members, the vertically slidable members extending from one side of the tubular members and having means on their outer ends for supporting the ends of a warp beam, a horizontally disposed shaft mounted above the upper ends of the tubular members and a driving connection between the horizontally disposed shaft and the threaded shafts for raising and lowering the vertically slidable members, a pair of posts rising upwardly from the frame and having a plurality of laterally projecting members associated therewith which project above the vertically slidable members and onto which harness frames associated with a warp beam removed from a loom may be suspended for transport of the warp beam and harnesses associated therewith from the loom to another portion of a mill.

3. A truck for transporting warp beams and harnesses comprising a wheeled frame provided with side portions spaced farther apart than the width of a loom so that said side portions can pass on opposed sides of a loom, vertically movable members disposed in said side portions, said frame also having uprising members thereon provided with laterally projecting means adapted to receive and support in a swinging manner harnesses from a loom associated with a warp beam to be removed from the loom, said vertically movable members having cavities in their upper surfaces adapted to pass beneath the end portions of a warp beam, a shaft extending between the side portions, driving connections between the shaft and the vertically movable members and means for imparting rotational movement to the shaft whereby, upon rotation of said shaft in one direction, the vertically movable members will both be raised simultaneously and, upon rotation of the shaft in the opposite direction, the vertically movable members will both be lowered simultaneously to thus raise and lower opposed ends of the warp beam accordingly.

NOAH W. EUREY.

REFERENCES CITED

The following references are of record in the file of this patent:

UNITED STATES PATENTS

| Number | Name | Date |
| --- | --- | --- |
| 1,304,661 | Colman | May 27, 1919 |
| 1,304,846 | Blair | May 27, 1919 |
| 1,304,875 | Hathaway et al. | May 27, 1919 |
| 1,339,507 | Hathaway et al. | May 11, 1920 |